United States Patent
Steffler

(10) Patent No.: US 8,234,461 B2
(45) Date of Patent: Jul. 31, 2012

(54) SYSTEMS AND METHOD FOR DATA SURVIVABILITY

(75) Inventor: Joseph Bernard Steffler, Alto, MI (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 12/415,019

(22) Filed: Mar. 31, 2009

(65) Prior Publication Data

US 2010/0250057 A1    Sep. 30, 2010

(51) Int. Cl.
G06F 13/00    (2006.01)

(52) U.S. Cl. ............ 711/148; 711/5; 711/100; 711/117; 714/48; 714/798

(58) Field of Classification Search ............... 711/5, 100, 711/117, 148; 714/48, 798
See application file for complete search history.

(56) References Cited

U.S. PATENT DOCUMENTS

| | | | |
|---|---|---|---|
| 4,644,494 A * | 2/1987 | Muller | 711/152 |
| 4,656,585 A | 4/1987 | Stephenson | |
| 4,970,648 A | 11/1990 | Capots | |
| 5,508,922 A | 4/1996 | Clavelloux et al. | |
| 6,182,239 B1 * | 1/2001 | Kramer | 714/5.1 |
| 6,418,068 B1 * | 7/2002 | Raynham | 365/200 |
| 7,434,132 B2 * | 10/2008 | Gromyko | 714/747 |
| 2006/0184846 A1 | 8/2006 | Hillier et al. | |
| 2008/0270717 A1 | 10/2008 | Shaw et al. | |
| 2008/0301530 A1 * | 12/2008 | Spanel et al. | 714/765 |
| 2009/0006900 A1 * | 1/2009 | Lastras-Montano et al. | 714/42 |
| 2010/0293439 A1 * | 11/2010 | Flynn et al. | 714/763 |
| 2010/0293440 A1 * | 11/2010 | Thatcher et al. | 714/764 |

FOREIGN PATENT DOCUMENTS

EP    0528518 A2    2/1993

OTHER PUBLICATIONS

PCT/US2010/023811, Search Report and Written Opinion, May 27, 2010.

* cited by examiner

*Primary Examiner* — Paul N Dickson
*Assistant Examiner* — Nicole Verley
(74) *Attorney, Agent, or Firm* — David J. Clement, Esq.; Armstrong Teasdale LLP

(57) ABSTRACT

Systems and a method for storing data are provided. The protected memory system includes a memory array including a plurality of memory modules each separately located with respect to each other and a memory controller configured to receive data to be stored from the data acquisition unit, store the received data in corresponding memory locations in each of the plurality of memory modules wherein the stored data including error checking information, read data from a first one of the plurality of memory modules until a data error is detected at a first memory location, read data from a second memory location of a second one of the plurality of memory modules wherein the data read from the second memory location corresponds to the data read from the first memory location, and replace the data read from the first memory location with the data read from the second memory location.

9 Claims, 2 Drawing Sheets

SYSTEMS AND METHOD FOR DATA SURVIVABILITY

BACKGROUND OF THE INVENTION

The field of this invention relates generally to protective enclosures for electronic components and, more particularly, to systems and method for protecting recorded data in a memory from post crash effects.

At least some known crash-protected memories (CPM) for flight data recorders (FDR) utilize a solid-state memory for preserving data recorded during a flight or other transit of a vehicle for analysis in the event of, for example, a crash. Such CPMs typically use Single-Level Cell (SLC) NAND Flash memory devices utilizing 50 nm or larger lithography to meet the data survivability requirements for Flight Data Recorders (FDRs). The relatively wide guard-band in the level of charge that determines a logical "1" or a "0" tolerates a certain level of degradation in the cell before it fails. However, this guard-band is reduced geometrically as lithographies are reduced in order to meet manufacturing price targets and yields. As the solid-state memory devices utilized in the crash-protected memory (CPM) modules use smaller and smaller lithographies, their ability to retain data at high temperatures begins to diminish. Exposure to high temperatures associated with a burn event of a crash incident eventually produces random bit failures that corrupt the data stored within the CPM. While the addition of Error Correcting Code (ECC) circuitry plus its additional memory devices is one potential solution to maintaining data integrity, the additional power required of the ECC circuitry must also be dissipated within the CPM and adds to the thermal management issues in the CPM. Eventually, SLC NAND Flash technology will no longer be suitable for use within a CPM.

BRIEF DESCRIPTION OF THE INVENTION

In one embodiment a protected memory system for storing data for recovery after an off-normal event includes a memory array comprising a plurality of memory modules each separately located with respect to each other and a memory controller communicatively coupled to a data acquisition unit and to each of the plurality of memory modules. The memory controller is configured to receive data to be stored from said data acquisition unit and store the received data in corresponding memory locations in each of the plurality of memory modules, the stored data including error checking information. The memory controller is further configured to read data from a first one of the plurality of memory modules until a data error is detected at a first memory location, read data from a second memory location of a second one of the plurality of memory modules wherein the data read from the second memory location corresponds to the data read from the first memory location, and replace the data read from the first memory location with the data read from the second memory location.

In another embodiment a method of storing and retrieving data from a protected memory system includes storing identical copies of a series of data packets in corresponding memory locations in a plurality of memory modules wherein each memory module separate from at least one other memory module and each memory module storing one or more copies of the series of data packets. The method also includes reading the series of data packets from one of the plurality of memory modules until an error in the data packet is detected, reading a data packet from another of the plurality of memory modules that corresponds to the data packet having the detected error, and outputting the error-free series of data packets.

In yet another embodiment a flight data recorder includes a data acquisition unit configured to receive a plurality of data signals and to generate a series of data packets for storage, at least one of the data packets in the series comprising an error-checking portion, a crash-protected memory portion comprising a memory array of a plurality of memory modules each separately located with respect to each other, and a memory controller communicatively coupled to said data acquisition unit and to each of the plurality of memory modules. The memory controller is configured to store identical copies of the series of data packets in corresponding memory locations in the plurality of memory modules wherein each memory module is separate from at least one other memory module and each memory module is configured to store one or more copies of the series of data packets. The memory controller is also configured to read the series of data packets from one of the plurality of memory modules until an error in the data packet is detected, read a data packet from another of the plurality of memory modules that corresponds to the data packet having the detected error, and output the error-free series of data packets.

BRIEF DESCRIPTION OF THE DRAWINGS

FIG. 1 is a schematic block diagram of a flight data recorder in accordance with an exemplary embodiment of the present invention; and FIG. 2 is a flow diagram of an exemplary method of storing and retrieving data from a protected memory system in accordance with an exemplary embodiment of the present invention.

DETAILED DESCRIPTION OF THE INVENTION

The following detailed description illustrates embodiments of the invention by way of example and not by way of limitation. It is contemplated that the invention has general application to systems and a method for preserving data stored on memory components from harsh environments in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
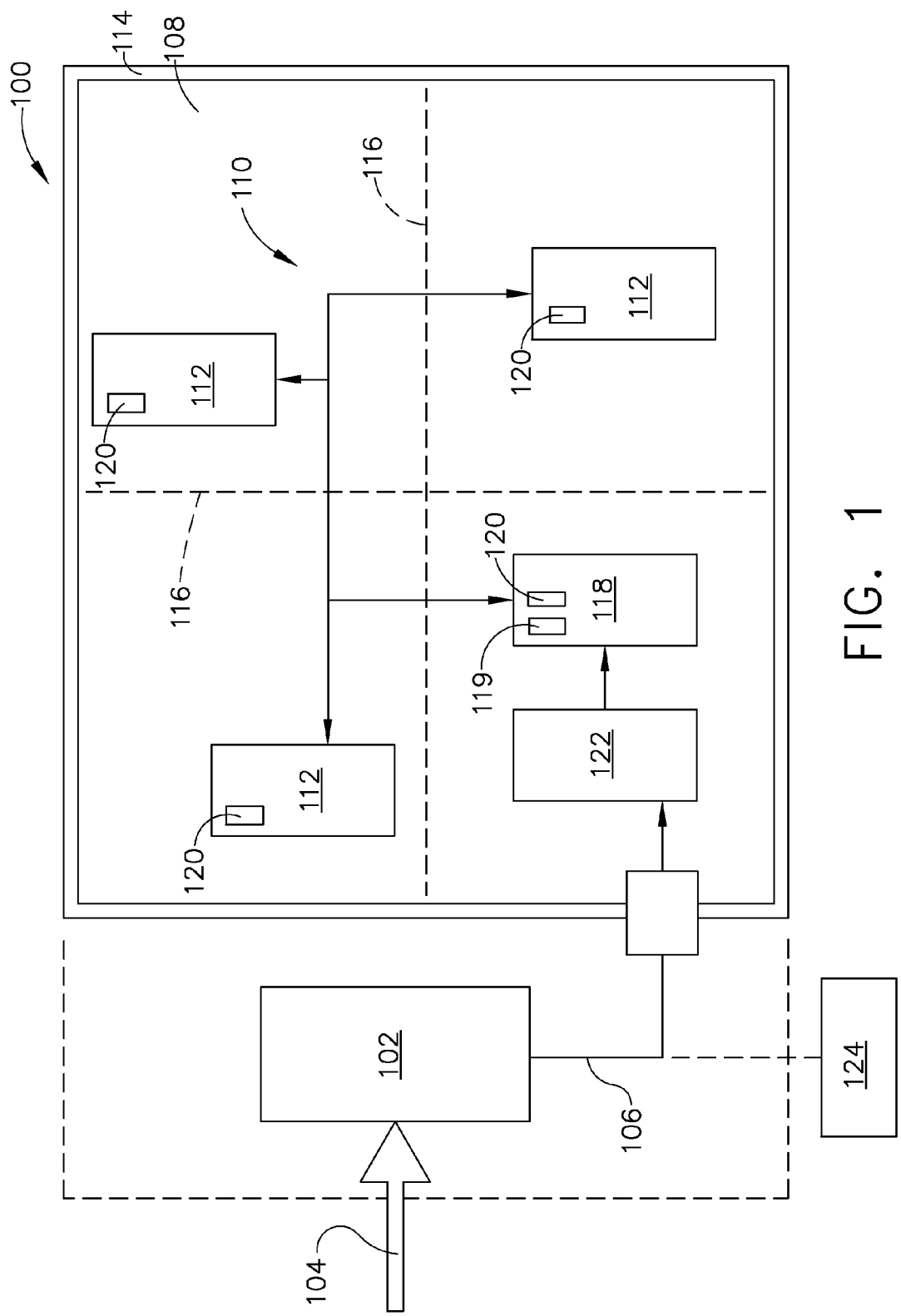
FIGS. 1-2 show exemplary embodiments of the systems and method described herein.

FIG. 1 is a schematic block diagram of a flight data recorder 100 in accordance with an exemplary embodiment of the present invention. In the exemplary embodiment, flight data recorder 100 includes a data acquisition unit 102 configured to receive a plurality of data signals 104 and to generate a series of data packets 106 for storage. The data packets include a data portion and at least one of the data packets in the series includes an error-checking portion. Flight data recorder 100 includes a crash-protected memory 108 that including a memory array 110 of a plurality of memory modules 112. In the exemplary embodiment, memory modules 112 are located separately with respect to each other. For example, memory modules 112 may be located spaced apart in a single enclosure 114, may be spaced apart in single enclosure 114 that is subdivided by partitions 116 that facilitate reducing heat transfer from one portion of enclosure 114 to another portion of enclosure 114.

Flight data recorder 100 also includes a memory controller 118 communicatively coupled to data acquisition unit 102 and to each of the plurality of memory modules 112. In one embodiment, memory controller 118 includes a processor 119 programmed to perform the functions described herein and a memory 128 for storing instructions for use by processor 119. Memory controller 118 is configured to store identical copies of the series of data packets 106 in corresponding memory locations 120 in the plurality of memory modules 112. Each of memory modules 112 is separate from at least one other memory module so that environmental conditions that may affect the memory retention capability of one of memory modules 112 may not affect another separately located memory module 112 to the same degree enhancing the probability of recovering all the data stored in the array of memory modules 112. Each memory module 112 is configured to store one or more copies of the series of data packets 106. Because data loss due to random bit failures in a memory are random, maintaining redundant copies of the stored data packets 106 may be accomplished by storing mirror copies on a single memory module 112. However, in the exemplary embodiment, the stored data packets 106 are saved to memory modules separated by a predetermined distance. In an alternative embodiment, memory modules may be located in different encloses that may also be separated with respect to each other by a second predetermined distance.

Memory controller 118 is also configured to read the series of data packets 106 from one of the plurality of memory modules 112 until an error in the data packet 106 is detected. When reading data packets 106 from memory locations 120 in one of the plurality of memory modules 112, memory controller 118 performs an error check of the data portion of at least some data packets 106 using the error check portion saved with data packets 106. If memory controller 118 detects that a data packet has been corrupted, potentially by a random bit failure due to, for example, heating from a crash instigated fire, memory controller 118 determines the memory location 120 from where the corrupted data was read and retrieves the data packet 106 stored in a corresponding memory location 120 in another of the plurality of memory modules 112 sequentially until memory controller 118 locates an error-free replacement for the corrupt data packet 106, or fails. If an error-free replacement is located, memory controller 118 replaces the corrupt data packet 106 with the error-free data packet 106 when outputting the series of data packets 106 through a communication interface 122 to a data reader 124. In the exemplary embodiment, data reader 124 is communicatively coupled to crash-protected memory 108 after an off-normal event, such as a crash, to download stored data for investigation purposes. The off-normal event may include a high temperature event, a shock event, and a moisture event, all of which that may accompany a crash of a vehicle, such as an aircraft.

Figure 2:
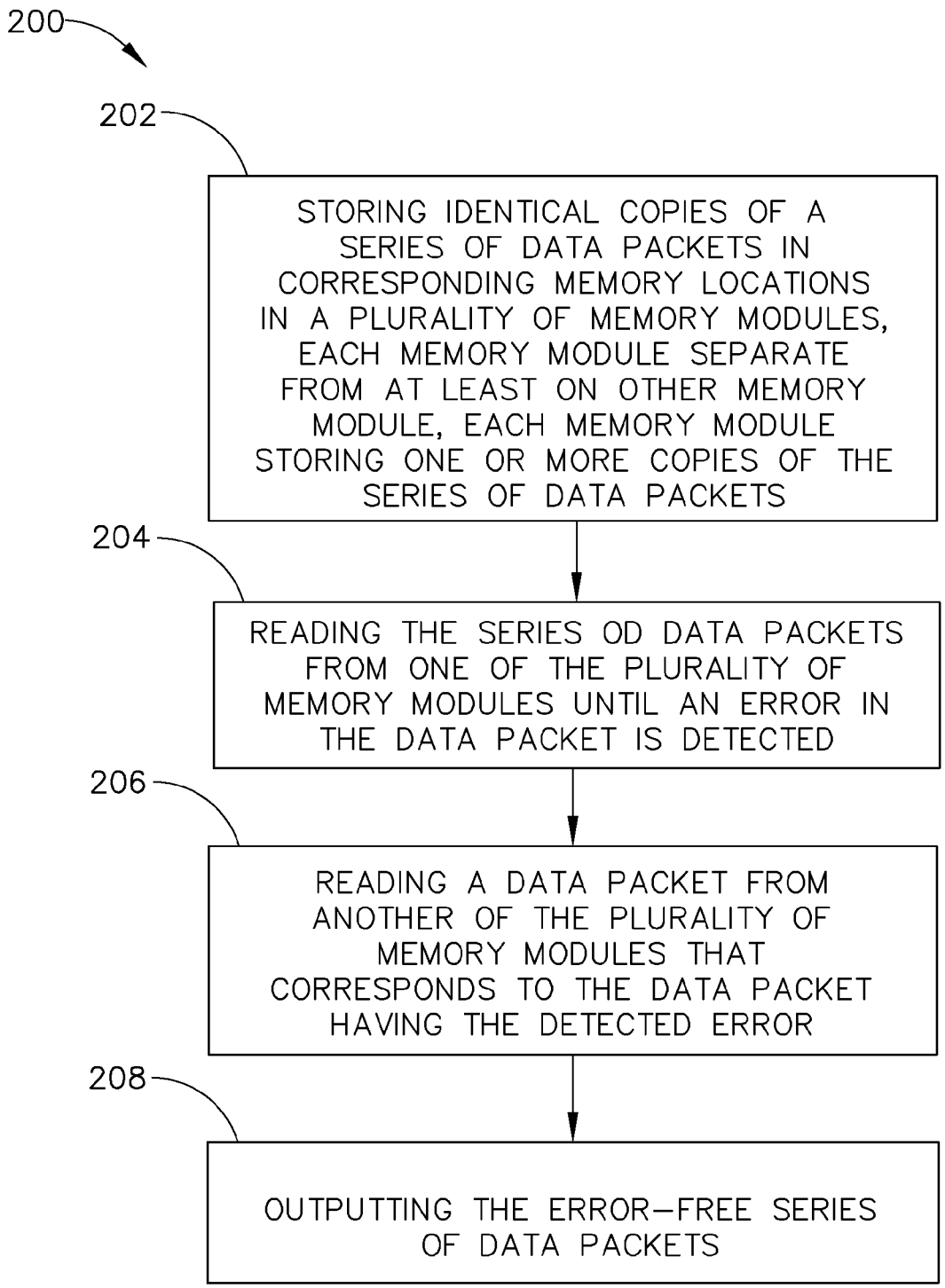

FIG. 2 is a flow diagram of an exemplary method 200 of storing and retrieving data from a protected memory system in accordance with an exemplary embodiment of the present invention. Method 200 includes storing 202 identical copies of a series of data packets in corresponding memory locations in a plurality of memory modules, each memory module separate from at least one other memory module, each memory module storing one or more copies of the series of data packets. In one embodiment, method 200 includes writing the series of data packets that include an error-checking portion into respective memory locations in a first memory module of an array of a plurality of memory modules and writing the series of data packets into respective memory locations in other memory modules of the array of memory modules.

Method 200 also includes reading 204 the series of data packets from one of the plurality of memory modules until an error in the data packet is detected, reading 206 a data packet from another of the plurality of memory modules that corresponds to the data packet having the detected error, and outputting 208 the error-free series of data packets. The data stored in the plurality of memory modules is read after an off-normal event and during an investigation of the causes of the off-normal event. A reader may be communicatively coupled to the communication interface, to the memory controller, or directly to the plurality of memory modules. While reading the data stored in the memory modules the controller or reader checks the data integrity using an error checking code, for example, but not limited to, cyclic redundancy check (CRC) where a checksum stored with the data is analyzed during a read process to determine if portions of the data have changed during storage. Other error checking codes may be implemented separately or in combination with CRC. When the controller or reader detects an error in a data packet, a corresponding data packet stored in a different memory location in the same memory module or in a memory location in another of the plurality of memory modules where data corresponding to the corrupt data packet is stored is then read and if that data packet is determined to be error-free, it is used to replace the corrupt data packet. If that data packet is detected to be corrupt, the controller or reader reads a corresponding memory location in another memory module until an error-free data packet is located. When an error-free packet is located the controller or reader can continue reading data packets from either the memory module it begin reading data from or may continue reading data packets from the memory module where the error-free data packet was located.

The probability that the identical data packet within two or more independent memory modules would become corrupt are determinably low. Accordingly, using multiple storage locations for identical data returns the CPM memory retention rate to the overall error-rate allowed in industry-standard specifications for Flight Data Recorders (FDRs) without having to resort to Error Correcting Code (ECC) circuitry and algorithm. This permits the continued use of SLC NAND Flash technology even as Lithographies continue to shrink below 50 nm. The implementation also has little effect on the data bandwidth or performance of the CPM in normal use.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 119.

As used herein, the term memory may include RAM memory, ROM memory, EPROM memory, EEPROM memory, and non-volatile RAM (NVRAM) memory. The above memory types are exemplary only, and are thus not limiting as to the types of memory usable with flight data recorder 100.

As will be appreciated based on the foregoing specification, the above-described embodiments of the disclosure may be implemented using computer programming or engineering techniques including computer software, firmware, hardware or any combination or subset thereof, wherein the technical effect is permitting continued use of SLC NAND flash technology in vital memory systems exposed to harsh environments even as lithographies continue to shrink below 50 nm. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a systems and method for storing data for recovery after an off-normal event provides a cost-effective and reliable means for permitting recovery of data stored in a heat sensitive memory component from high temperature, shock, and moisture. More specifically, the systems and method described herein facilitate improving the probability of recovering error-free data from a flight data recorder. In addition, the above-described systems and method facilitate reading data from a memory after a crash where an adverse environment of mechanical shock, fire, and/or moisture can damage the memory storage component. As a result, the systems and method described herein facilitate data survivability during and after an off-normal event where a heat sensitive component may be exposed to high temperature, shock, and moisture in a cost-effective and reliable manner.

Exemplary systems and a method for automatically locating error-free data stored in a memory system that is subject to harsh environments are described above in detail. The systems illustrated are not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A protected memory system for storing data for recovery after an off-normal event, said system comprising:
    a memory array comprising a plurality of memory modules each separately located with respect to each other;
    a memory controller communicatively coupled to a data acquisition unit and to each of the plurality of memory modules, said controller configured to:
        receive data to be stored from said data acquisition unit;
        store the received data in corresponding memory locations in each of the plurality of memory modules, the stored data including error checking information;
        read data from a first one of the plurality of memory modules until a data error is detected at a first memory location;
        read data from a second memory location of a second one of the plurality of memory modules wherein the data read from the second memory location corresponds to the data read from the first memory location; and
        replace the data read from the first memory location with the data read from the second memory location.

2. A protected memory system in accordance with claim 1 wherein the data stored in one memory module of the plurality of memory modules is redundant of the received data stored in any of the others of the plurality of memory modules.

3. A protected memory system in accordance with claim 1 wherein said plurality of memory modules are separated a predetermined distance apart in a single enclosure.

4. A protected memory system in accordance with claim 3 wherein said single enclosure comprises a crash-protected enclosure.

5. A protected memory system in accordance with claim 1 wherein the first memory location from the first one of the plurality of memory modules has the same address as the second memory location in the second one of the plurality of memory modules.

6. A protected memory system in accordance with claim 1 wherein said controller is configured to output
    read data from a third memory location in subsequent ones of said plurality of memory modules that correspond to the first memory location until data read from the third memory location is error-free; and
    replace the data read from the first memory location with the data read from the third memory location.

7. A protected memory system in accordance with claim 1 wherein the off-normal event comprises at least one of a high temperature event, a shock event, and a moisture event.

8. A protected memory system in accordance with claim 1 wherein said controller is configured to output only data that is error-free.

9. A protected memory system in accordance with claim 1 wherein said controller is configured to store data in said first of said plurality of memory modules that is a mirror-image of the stored data in each other of said plurality of memory modules.

* * * * *